(12) United States Patent
Fletcher et al.

(10) Patent No.: US 7,574,302 B2
(45) Date of Patent: Aug. 11, 2009

(54) PARCEL NETWORKS

(75) Inventors: Michael James Fletcher, Lindfield (AU); Michael Hele Elfick, Wallalong (AU)

(73) Assignee: Geodata Information Systems Pty Limited, North Sydney (AU)

( * ) Notice: Subject to any disclaimer, the term of this patent is extended or adjusted under 35 U.S.C. 154(b) by 1196 days.

(21) Appl. No.: 10/475,649

(22) PCT Filed: Apr. 12, 2002

(86) PCT No.: PCT/AU02/00473

§ 371 (c)(1),
(2), (4) Date: Apr. 8, 2004

(87) PCT Pub. No.: WO02/086770

PCT Pub. Date: Oct. 31, 2002

(65) Prior Publication Data

US 2004/0172264 A1    Sep. 2, 2004

(30) Foreign Application Priority Data

Apr. 24, 2001   (AU) ..................... PR4586

(51) Int. Cl.
   *G06F 19/00*   (2006.01)

(52) U.S. Cl. ........................................................ 702/1
(58) Field of Classification Search ................. 702/5, 702/16, 92, 94, 188; 705/1, 403, 404, 406, 705/408; 709/220, 222, 250
See application file for complete search history.

(56) References Cited

U.S. PATENT DOCUMENTS

| | | | |
|---|---|---|---|
| 5,745,751 A | 4/1998 | Nelson et al. | 707/104.1 |
| 5,857,066 A | 1/1999 | Wyche et al. | 345/420 |
| 7,363,233 B1 * | 4/2008 | Levine | 705/1 |
| 2001/0014185 A1 | 8/2001 | Chitradon et al. | 382/305 |

* cited by examiner

*Primary Examiner*—Edward Raymond
*Assistant Examiner*—Mohamed Charioui
(74) *Attorney, Agent, or Firm*—Steptoe & Johnson LLP

(57) ABSTRACT

The present invention provides apparatus for defining a parcel network in a control coordinate system. The parcel network is formed from a number of interconnected parcels with each parcel being formed from a number of interconnected boundary lines. The parcels are defined by survey data which specifies the distance and direction between end points of the interconnected boundary lines for each parcel. In use the apparatus operates to join the parcels together to form the parcel network, with the parcel network being defined in terms of network coordinates. The apparatus then maps the coordinates of the network points into the control coordinate system.

23 Claims, 9 Drawing Sheets

PARCEL NETWORKS

BACKGROUND OF THE INVENTION

The present invention relates to apparatus, a method and a computer program product for generating parcel networks, and in particular for constructing parcel networks from survey data.

DESCRIPTION OF THE PRIOR ART

The reference to any prior art in this specification is not, and should not be taken as, an acknowledgment or any form of suggestion that the prior art forms part of the common general knowledge in Australia.

Real property (land) is a fundamental natural resource for any economic activity. Accordingly, it is desirable to be able to construct geographic information systems (GIS) in which areas of land can be uniquely identified, allowing the ownership and value of land to be monitored accurately. This is usually achieved using cadastral systems.

Modern legal cadastral systems are designed to provide land and real estate owners and interested parties with security of tenure while also providing an efficient means for the transfer of ownership and interests in the real estate market.

Most countries currently use dimension based cadastral systems in which areas of land are subdivided into a large number of individual parcels, each of which has dimensioned boundaries (the metes) and information showing the relationship of each boundary with physical objects and adjacent parcels (the bounds).

Current methods of boundary definition have been adequate for a long period of time. However, because the techniques use dimensions, this provides a very indirect way of defining a point and disputes arise when different surveyors use different data to determine the location of a boundary.

In particular the cadastral systems are based on data that has been collected for over 100 years and its quality and accuracy of each record is generally a function of the date of the record itself and the surveying technology available at the time. Thus, for example, prior to 1880, survey transits were not commonly in use and angles were measured to the nearest half-degree. Over the years, developments in angle measurement technology in survey transits and theodolites have improved this accuracy and many of the modem instruments in use have an accuracy of close to five seconds of arc. Similarly, the technology for manually measuring distances steadily improved until about 1970 when electronic distance measurement was introduced. Modern instruments can now measure distances of 1000 meters to a precision of better than five millimetres.

In addition to this, the completeness of the record and the standard of presentation of the plans and documents in the record are largely dependent on the authority which manages the record system in each locality. Thus for example, in countries where the state guarantees title, such as in Australia and New Zealand, the records are complete and the documents generally of a good quality. In other countries the records may be held in various locations with little supervision on the quality of presentation of document.

In contrast to this, a coordinate can provide a unique and unambiguous definition of a point and GPS can provide the necessary technology to quickly and accurately locate that point. At present most surveyors compute new subdivisions laying in the corners by coordinates, then preparing "metes and bounds" documents to satisfy the legal requirements for land transfer. Technology has allowed surveyors to adopt a coordinate based approach and this can be used to reform the land ownership record system.

Accordingly, in most countries of the world there is a move towards replacing the dimension metes and bounds cadastre with a coordinated cadastre in which the location of land parcels is uniquely identified using geographical coordinates.

In order to achieve this, coordinates have initially been used simply as another dimension to assist in the location of parcel corners, but as control becomes more established, coordinates will become the sole definition.

In theory a coordinate cadastre could be determined by resurveying every parcel. However, this would be totally impractical and unnecessary as there is already adequate dimensional data available within the existing survey record system to carry out this job provided that control data is applied where needed.

Accordingly, it is preferable to utilise existing data and use this to determine a coordinate based system.

Currently, the most common method of achieving such a coordinate cadastre in GIS systems is by digitising administrative documents such as tax maps. The accuracy of this data depends on the maps and the quality of the digitising process. Many of these maps were designed simply to show the relationship of the various attributes to each other rather than being compiled to an accurate coordinate base. Consequently, the accuracy of position varies from place to place and any mistakes in the original map compilation are also carried forward into the digitised records.

There are many systems in use to improve the accuracy of this type of data and these include "rubber sheeting" or adjusting to extra control from GPS or photogrammetric data such as orthophoto maps. However, whilst these systems improve positional accuracy near to each control point but overall they do nothing to correct the inaccuracies in the base data. To overcome that problem it would be necessary to have a control point at nearly every corner.

In contrast to this, if the Land Ownership layer is built directly from the dimensions shown on subdivision plats, it will not only provide a complete and accurate base layer, but will open the way for coordinate based property boundaries.

To gain maximum benefit from the existing survey data, the building process should not only extract data from the plats and build the boundary network, but it should also analyse the data and provide a measure as to the reliability and accuracy of the computed coordinates. This will then open the way for these coordinates to become the definition of property boundaries.

However, it has generally been considered too complicated and costly to build the property ownership layer directly from dimensions data contained in the source documents. The reasons for this relate partly to the lack of systems for processing this type of data and partly to the lack of understanding as to the structure and characteristics of this data.

In particular, the traditional approach to building a property boundary layer from the source data has been to first set in place a control network, then progressively add data to the control and finally adjust the total data set. Such an approach can be very costly to implement and requires staff with considerable expertise in the management of boundary data.

SUMMARY OF THE PRESENT INVENTION

In a first broad form the present invention provides apparatus for defining a parcel network in a control coordinate system, the parcel network being formed from a number of interconnected parcels, and each parcel being formed from a number of interconnected boundary lines, the apparatus including:
- a) An input for receiving survey data defining the number of parcels, the survey data specifying the distance and direction between end points of the interconnected boundary lines for each parcel;
- b) A store for storing the survey data;
- c) A display; and,
- d) A processor adapted to:
  - i) Join the parcels together to form the parcel network, the parcel network being defined in terms of network coordinates, the network coordinates defining the relative positions of network points in a network coordinate system, each network point corresponding to the position of a parcel end point within the network; and,
  - ii) Map the coordinates of the network points into the control coordinate system.

In a second broad form the present invention provides a method of defining a parcel network in a control coordinate system, the parcel network being formed from a number of interconnected parcels, and each parcel being formed from a number of interconnected boundary lines, the method including:
- a) Receiving survey data defining the number of parcels, the survey data specifying the distance and direction between end points of the interconnected boundary lines for each parcel;
- b) Joining the parcels together to form the parcel network, the parcel network being defined in terms of network coordinates, the network coordinates defining the relative positions of network points in a network coordinate system, each network point corresponding to the position of a parcel end point within the network; and,
- c) Mapping the coordinates of the network points into the control coordinate system.

In a third broad form, the present invention provides a computer program product comprising computer executable code for causing a processor to perform the method of the second broad form of the present invention.

In a fourth broad form the present invention provides a parcel network generated according to the method of the second broad form of the present invention, or generated using the apparatus of the first broad form of the present invention.

Typically the processor is adapted to join the parcels together to form the parcel network by:
- a) Selecting an unjoined parcel;
- b) Joining the unjoined parcel to one or more joined parcels; and,
- c) Repeating steps (a) and (b) for each unjoined parcel.

In particular, the processor is preferably adapted to join the parcels together by:
- a) Causing the user to select an unjoined parcel;
- b) Determining relative coordinates of the unjoined parcel, the relative coordinates defining the relative positions of the parcel end points in an arbitrary coordinate system;
- c) Causing the display to display:
- d) One or more joined parcels that form an existing parcel network; and,
- e) An unjoined parcel;
- f) Causing the user to define a join between at least two parcel end points of the unjoined parcel and at least two network points;
- g) Determining a parcel transformation which maps the relative coordinates of the at least two parcel end points to the network coordinates of the corresponding network points; and,
- h) Applying the parcel transformation to each of the parcel end points, to thereby map the parcel coordinates into the network coordinate system, thereby joining the parcels.

If more than two end points were used in determining the parcel transformation, the processor is usually adapted to:
- a) Determine the separation distance between the mapped relative coordinates of the end point and the network coordinates of the corresponding network point for each of the parcel end points used in determining the parcel transformation;
- b) Determine an outlier end point in accordance with the results of the separation distance determination;
- c) Determine a new parcel transformation excluding the outlier point.
- d) Determine the separation distance between the mapped relative coordinates of the end point and the network coordinates of the corresponding network point for each of the parcel end points used in determining the new parcel transformation;
- e) Determine the standard deviation of the separation distance for the new parcel transformation;
- f) Compare the separation distance of the outlier to a threshold equal to three standard deviations; and either:
  - i) Use the original parcel transformation if the separation distance of the outlier is less than the threshold; or,
  - ii) Use the new parcel transformation if the new parcel transformation is determined using only two end points; or,
  - iii) Repeat steps (a) to (f) for the new parcel transformation.

The outlier end point is generally determined by:
- a) Determining the average separation distance for the end points; and
- b) Determining the outlier point to be the end point whose separation distance differs most from the average separation distance.

The processor typically maps the coordinates of the network points into the control coordinate system by:
- a) Selecting two or more network points to be control points;
- b) Determining control coordinates of the control points, the control coordinates representing the position of the control points in the control coordinate system;
- c) Determining a network transformation which maps the network coordinates of the control points to the corresponding control coordinates; and,
- d) Applying the network transformation to each of the network points, to thereby map the parcel network to the control coordinate system.

If more than two control points were used in determining the network transformation, the processor is preferably further adapted to:
- a) Determine the separation distance between the mapped network coordinates and the corresponding control coordinates for each of the control points used in determining the network transformation;
- b) Determine an outlier control point in accordance with the results of the separation distance determination;
- c) Determine a new network transformation excluding the outlier point.
- d) Determine the separation distance between the mapped network coordinates and the corresponding control coordinates for each of the control points used in determining the new network transformation;

e) Determine the standard deviation of the separation distance for the new network transformation;

f) Compare the separation distance of the outlier to a threshold equal to three standard deviations; and either i) Use the original network transformation if the separation distance of the outlier is less than the threshold; or, ii) Use the new network transformation if the new network transformation is determined using only two control points; or, iii) Repeat steps (a) to (f) for the new parcel transformation.

The outlier control point is usually determined by:

a) Determining the average separation distance for the control points; and b) Determining the outlier control point to be the control point whose separation distance differs most from the average separation distance.

Upon input of the survey data for each parcel, the processor is typically adapted to:

a) Calculate any misclose for the parcel;

b) Cause the misclose to be compared to a predetermined misclose; and, c) Cause the input data to be checked if the misclose exceeds the predetermined misclose.

The comparison may be performed by the user or can alternatively be performed automatically be the processor.

The predetermined misclose is selected in accordance with the date on which the survey data was generated.

Upon input of the survey data for each parcel, the processor is usually also adapted to:

a) Calculate the area of the parcel;

b) Cause the area to be compared to a survey area determined when the parcel was surveyed; and, c) Cause the input data to be checked if the area differs from the survey area by more than a predetermined amount.

BRIEF DESCRIPTION OF THE DRAWINGS

An example of the present invention will now be described with reference to the accompanying drawings, in which:—

DETAILED DESCRIPTION OF THE PREFERRED EMBODIMENTS

Figure 1:
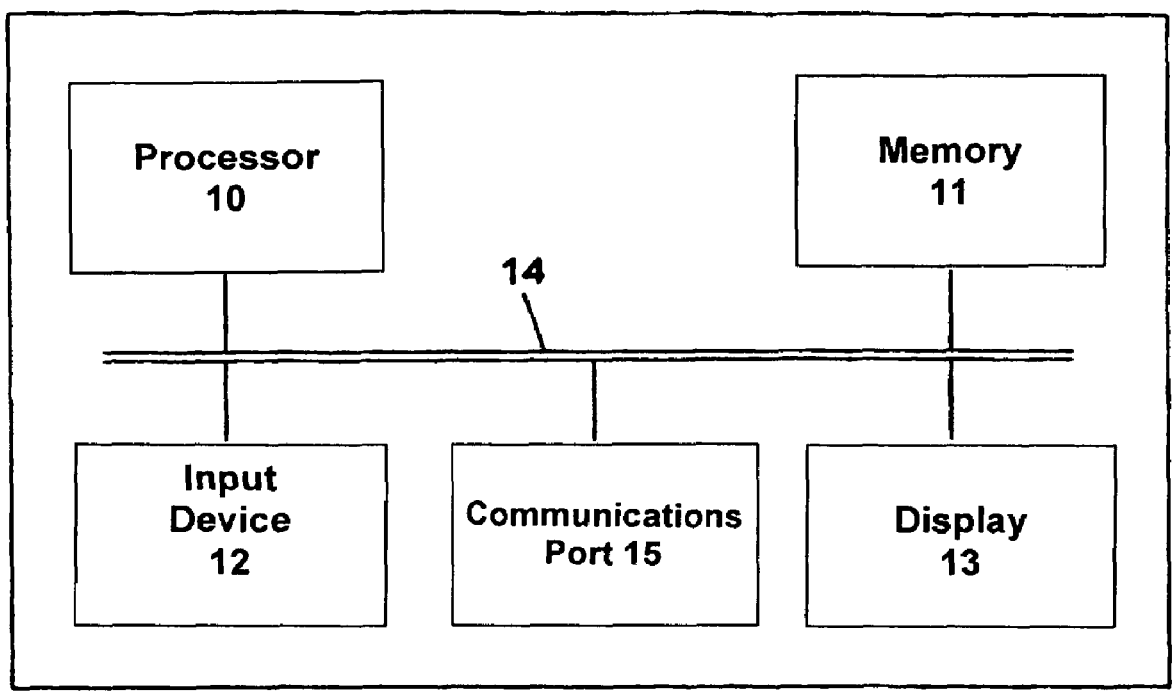
FIG. 1 is a schematic diagram of a process system for implementing the present invention.

An example of a processing system suitable for construction a coordinate based land parcel network is shown in FIG. 1.

As shown, the processing system includes a processor 10, a memory 11, an input device 12 and a display 13 that are coupled together via a bus 14. A communications port 15 may also be provided.

In use, a user of the system is able to enter data via the input device 12, which would typically be a keyboard and mouse, or the like. Alternatively data can be imported from external systems via the communications port 15 as will be explained in more detail below. Once the data has been received, it is typically stored in the memory 11, before being processed by the processor 10.

The memory 11 can be formed from a temporary memory such as RAM, or the like, or alternatively may be a permanent memory such as a hard disk. In this example the memory includes both temporary and permanent memory although for the purposes of simplicity, no distinction will be made in the following discussion.

In order to perform the processing, the processor 10 executes applications software that is stored in the memory 11. The applications software causes the processor to process the data and generate a parcel network under the instruction of a user of the system. During this process information including a representation of the final parcel network can be displayed to system user using the display 13.

Accordingly, it will be appreciated by a person skilled in the art that the processing system may be any one of a number of processing systems, such as a personal computer, a laptop, a PDA, a specialised terminal or the like.

The overall process for constructing a parcel network involves capturing, assembling and analysing metes and bounds survey data, then from this analysis determine the number and location of any control points. By mapping the control to physical coordinates, a coordinate cadastre is generated.

Cadastral data is very "localised" and each individual dimension only tends to influence the nearby boundaries. Consequently the data set is typically divided into management areas each of about 500 parcels. This size has been selected for several reasons including convenience, and efficient management.

Figure 2:
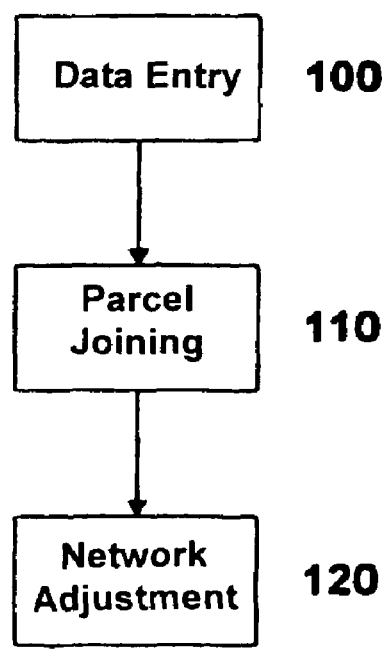
FIG. 2 is a flow diagram showing the overall process of the production of a coordinate based Land parcel network.

The process for constructing a parcel network is outlined in FIG. 2. As shown, the process involves three phases, namely a data entry phase 100, a parcel adjoining phase 110 and network adjustment phase 120.

In the data entry phase, the system operates to receive metes and bounds survey data of the boundaries that define the parcels of land to be included in the parcel network. In general in order for the completed parcel network to retain a reasonable degree of accuracy over its entire area without becoming unmanageable in size, it is usual to limit the number of parcels involved to several hundred.

The survey data can be entered manually by a user using the input device 12, or can be imported from an external device via the communications port 15, as will be described more detail below.

Once the data relating to a number of different parcels has been entered, it is then possible for the system to implement a parcel joining phase 110 to join the parcels together to thereby form a parcel network.

After the parcel network has been completed, control points are applied to the network to tie points in the network to respective geographical coordinates. The entire parcel network can then be translated into a geographical coordinate system to result in the construction of a coordinate based parcel network or cadastre.

The data entry phase will now be discussed in more detail.

In order to allow manual entry of the data, the processor 10 operates applications software which causes the processor 10 to display a graphical user interface (GUI) to the user on the display 14. The GUI will provide a number of different screens to allow the entry of different data.

Alternatively, the survey data can be imported from an external source via the communications port 15. In this case, processor 10 executes applications software that is adapted to receive the data and store it in the memory 11. As the received data may have a number of different formats, the applications software is generally specific to the source and format of the received data.

As the imported data is processed in substantially the same manner as the manually entered data (with the steps being carried out automatically by the processor) the remainder of the specification will focus on the techniques for manual entry and the importation will not be discussed in any more detail.

The received data is stored in the memory 11 as a text file. The structure of the text file is such that respective types of data are contained in respective lines of the text file, with different information being stored in different columns. A typical structure is shown in appendix A.

As shown, the data typically includes:
1) Job data representative of the particular parcel network construction procedure (only entered once for all the parcels in the survey) including:
   a) A Company Name indicating the name of the company providing the data;
   b) An Entry Date indicating the date the data was entered;
   c) An Operator Id representative of the user entering the data; and,
   d) A Program Version indicting the version of the applications software performing the parcel network generation.
2) Survey data representing details of when the parcel was surveyed including:
   a) A Plan Number indicating the number of the survey plan from which the information is obtained;
   b) A Survey Date indicating when the survey was performed;
   c) Plan Units indicating the units used in the survey (ie. metres, feet and inches)
   d) A Parcel number;
   e) A Parcel Type;
   f) A Join Flag (this indicates whether the parcel is joined to another parcel in the network and is filled in during the joining phase 110);
   g) The Legal Area representing the surveyed area of the parcel; and
   h) A Centroid Pt indicating a known location of the centre of the parcel.
3) Line data representing each boundary line of the parcel, including:
   a) A "From" point representing the point from which the boundary line extends (filled in by the processor 10 during the data entry phase)
   b) The Bearing of the boundary line from the point;
   c) The Distance or length of the boundary line;
   d) A "To" point representing the point to which the boundary line extends (filled in by the processor 10 during the data entry phase)
   e) A Line type;
   f) A Radius (for a curved line); and,
   g) Centre Pt (for a curved line).

In general, the same job data corresponds to a number of different parcels, and accordingly, the job heading may only be included once for a number of different parcel entries. A separate parcel heading is provided for each parcel within the job, with line data representing each boundary line of the parcel being stored in respective lines associated with the corresponding parcel heading. In addition to this data that are entered by the user, point data and coordinate data are also generated by the applications software during processing of the parcels. Again this information is stored within the text file as shown in Appendix A.

This point data defines point numbers assigned to each of the end points of the boundary lines. The point number are used to identify the end points during processing and in particular during transformation between different coordinate systems. In contrast, the coordinate data represents the coordinates of the end points in the current coordinate system.

In addition to storing coordinate data in the text file, the system also generates a coordinate array that stores the current coordinates of each parcel under consideration. The coordinate array is stored in a points file, the format of which is set out in Appendix B.

Returning to the data entry phase 100, the user will initially enter the job data required for the respective parcel network construction operation. Once this has been completed, the user goes on to enter the data associated with each parcel, as will now be described with reference to FIGS. 3A and 3B.

Figure 3A:
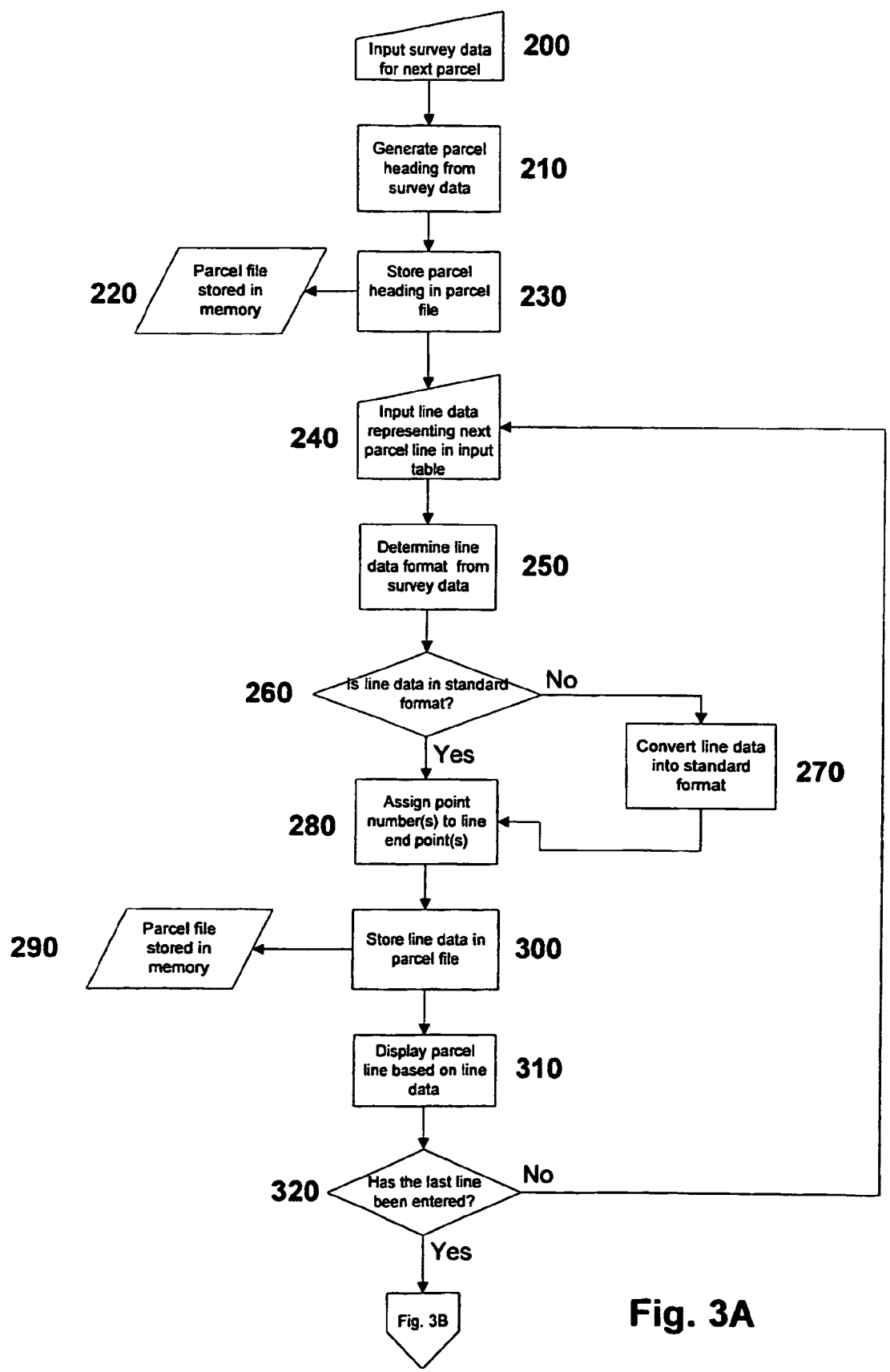
FIGS. 3A and 3B are flow diagrams showing the data entry of process.
Figure 3B:
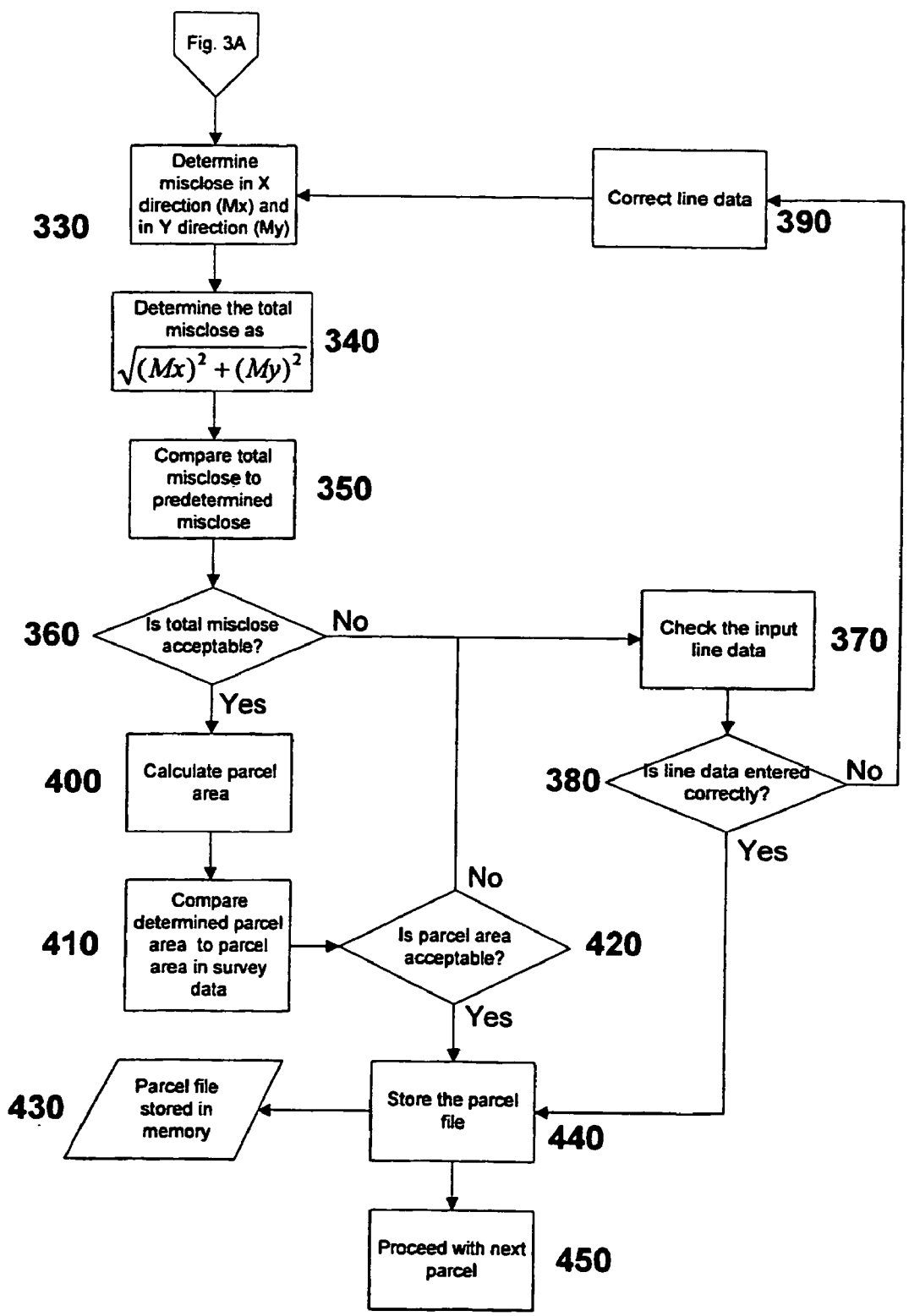

Initially, as shown in FIG. 3A, the user enters survey data for the next respective parcel, at step 200. The processor 10 uses the survey data to generate a parcel heading having the format shown in Appendix A at step 210. The parcel heading is then written into the next line in the parcel file stored in the memory 11, at steps 220, 230.

The next stage shown at step 240 is for the user to input the line data representing the next line in the parcel. This data is entered using the GUI screen shown in FIG. 4, which includes a table 20 and a parcel display 21. In use, the user enters the line data for the next parcel boundary line in the next row in the table 20.

The line data is entered in the form of a distance and a direction, or bearing, or angle. In general, the format of this information, and in particular the units of the data will typically vary depending on when and where the survey was performed. Accordingly, for example, distances can be entered as metric data, as feet, inches and fractions or as chains and links.

Accordingly, as the line data is entered, the processor 10 operates to determine the format of the line data, and in particular the units used, from the survey data stored in the parcel heading, as shown at step 250. The processor 10 determines if the data is in a standard format at step 260, which in this example is with the distances in metres and with the bearings in degrees. If the data is not in a standard format, the processor 10 operates to convert the data to the standard format at step 270.

Thus, for example, if a distance measurement is entered in feet, inches and fractions, the smallest fraction is a eighth of an inch. Accordingly, in this case, the processor 10 parses the entered data and if the second last character is a "/" then the last character is the fraction denominator and the third last character the numerator. The digits between that and the feet indicator are inches and the remainder of the character string is feet.

Similarly, bearings can be in degrees, minutes and seconds or can be quadrant bearings such as N67 30W or SOUTH etc.

The "decoding" is carried out by looking for the presence or absence of alpha characters in a logical order to determine the type of data and extract the value for the dimension.

In some localities (eg., Western Australia) the plans show angles at boundary corners instead of bearings along lines. The user can enter this type of data directly and it can be displayed either in that format or in bearing format upon request.

In most localities the orientation of the plan is based on the bearings shown on adjacent plans and these may in turn be on a local origin. However, where the boundaries are extensive such as in some rural areas, the direction of a boundary is shown as the orientation of the mid-point of the line at its centre point with respect to true north.

When these lines are processed, geodetic corrections have to be applied for earth curvature, height above seal level etc. However, the dimensions are needed to calculate the latitude and longitude of each point, whereas the latitude and longitude are needed to calculate the geodetic corrections for each line. Accordingly, at the input phase, these lines are flagged by the operator who enters the flag as part of the administrative information for each parcel. The remaining processing is then performed during the joining phase and the rest during the network adjustment phase.

Once the data is in a standard format, it is displayed in the table 20, as shown. At this point, the processor 10 assigns point numbers to the end points of each line in the parcel at step 280. This is achieved by generating respective numbers in the "from" and "to" columns shown in the table 20. The line data is then stored as a respective parcel line entry within the parcel file as shown at steps 290 and 300. The respective line is then drawn on the parcel display 21 at step 310.

During this data entry, the user may determine, for example by observation of the appearance of the parcel on the display 21, that a bearing has been reversed. Accordingly, a function key is provided for automatically reversing bearings.

Centres of curves and radial connections for circular curves are automatically generated from chord dimensions and if the chord dimensions are not available (such as on some plans in New Zealand, the software will generate this from arc and radius information.

As shown at step 320 after entering each line the user must determine whether this is the last line or not. If this not the last line, the user returns to step 240 and inputs the line data of the next line in the parcel.

Figure 4:
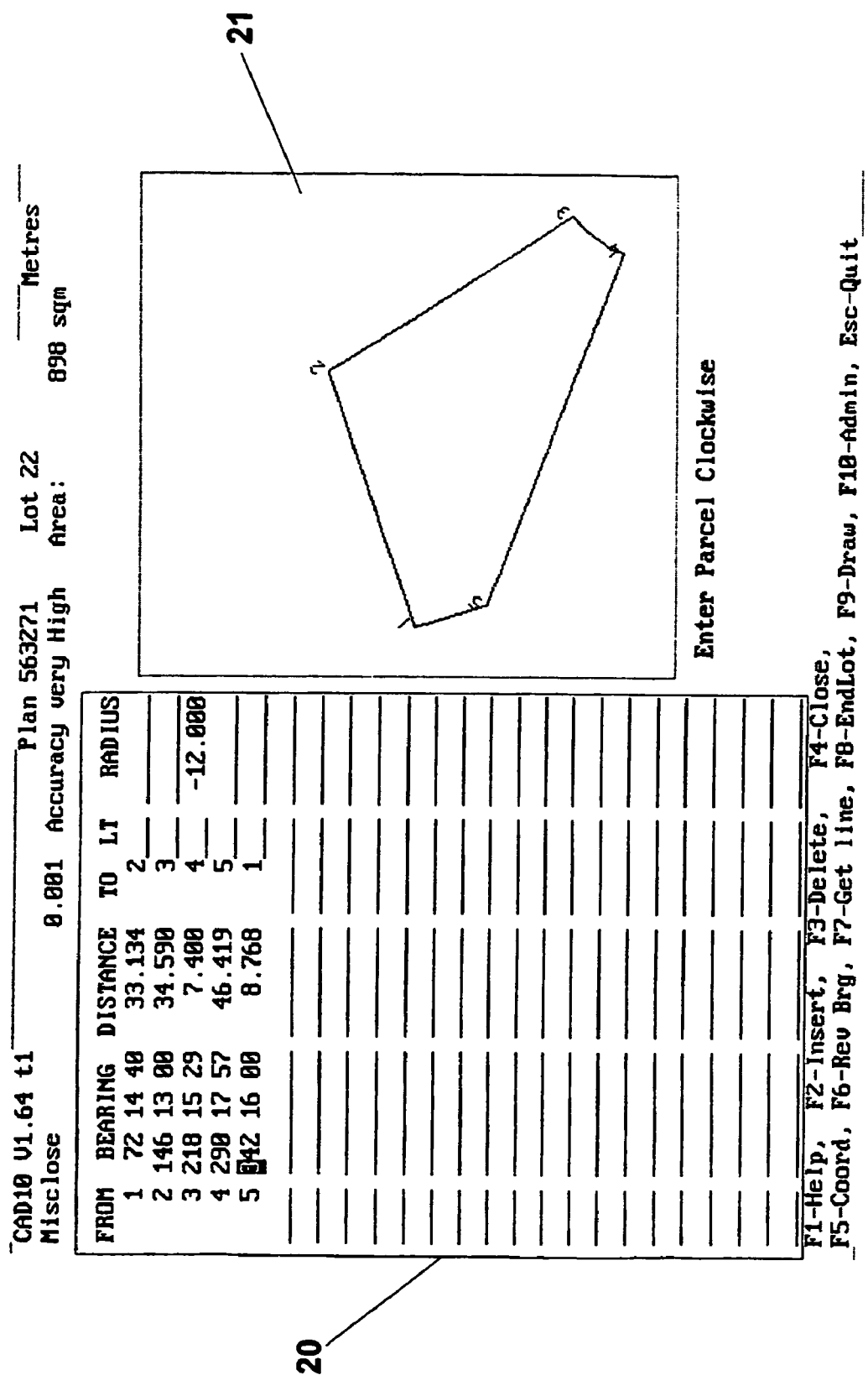
FIG. 4 is an example of the appearance of the display during the data entry process.

Once all the lines have been entered, the appearance of the GUI should be similar to that shown in FIG. 4 with the constructed parcel being displayed in the display 21 as shown at 22. In addition to this, the "To" column of the last line should refer to the first point of the first line (ie. the entry in row one of the "From" column).

At any time during the data entry stage, the processor 10 can be adapted to fill in any missing data automatically. In order to achieve this, the processor 10 is adapted to determine any misclose in the parcel (ie. points at which the parcel boundary lines do not meet). The program will then calculate missing data from the "misclose" in the lot The missing data may consist of two missing distances, or a missing bearing and a missing distance, or two missing distances, or a single missing bearing or a single missing distance. In order to calculate the missing data, the user simply leaves the missing fields blank and then requests that the processor 10 fill in the missing fields when the remaining fields are complete.

It will be noted that if the missing data includes two unknowns, then the lot will close exactly following the automatic fill in, whereas if there is only one unknown, there may still be a misclose.

In addition to this, any misclose is also used in determining the accuracy of the entered data. In order to achieve this, as shown at step 330, the processor 10 operates to determine the misclose in orthogonal X and Y directions Mx and My respectively. At step 340 the processor 10 determines the total misclose using the equation (1) as shown:

$$\text{Total misclose} = \sqrt{(Mx^2 + My^2)} \quad (1)$$

Step 350 the total misclose is compared to a predetermined misclose. The predetermined misclose is chosen depending on the origin and date of the survey data.

The comparison may be performed manually by having the total misclose displayed to the user and then prompting the user to indicate whether the misclose is acceptable at step 360. In this case, the user would compare the determine misclose to a list of miscloses which are acceptable under different circumstances. Thus, for example, older survey data will generally have a higher predetermined misclose as surveys were made using poorer measuring techniques and are therefore subject to greater errors.

Alternatively, a list of predetermined miscloses (and the conditions under which they apply) can be stored in the memory 11. In this case, the processor 11 obtains an indication of the predetermined misclose to be used based on the survey data. The processor 10 then determines the total misclose to be unacceptable if it exceeds the predetermined misclose.

In this case, if the misclose is within the limits expected for a plan of a given age and if the area computed agrees with the area stated on the plan, then it is very unlikely that there are any errors in the data.

Accordingly, if the misclose is deemed unacceptable the user checks whether the line data has been input correctly at step 370. If a mistake is located in the line data at step 380, this corrected at step 390 before the processor 10 operates to recalculate the misclose at step 330.

If the line data is correct, the processor 10 operates to store the parcel file at step 440 as will be explained in more detail below.

If the misclose is acceptable, it is then necessary to determine if the parcel area is correct by calculating the parcel area calculated from the input data at step 400 and comparing this to the parcel area specified in the survey at step 420. Again, this can be performed manually by the user, or automatically by the processor 10.

In the former case, the parcel area is displayed to the user who compares the parcel area to the parcel area indicated on the survey at step 420. In this case, if the parcel area is not acceptable at step 430 the process returns to step 370 for the user to check the input line data Otherwise the process continues to step 430 and 440 at which point the parcel file, which is usually constructed in temporary memory, will be written to permanent memory such as a hard disk or the like. This is done to avoid the parcel file being lost when the processing system is switched off or should a fault occur.

The system then proceeds on to the next parcel as shown step 450.

This process is repeated for each parcel, until a parcel file has been constructed that contains data for each of the parcels to be included in the parcel network. An example of a completed parcel file is shown in Appendix A.

Once the data entry process has been completed, the next stage is for the parcel joining phase 110 to be commenced. Parcels can be joined in one at a time, or another parcel network can be treated as a single parcel and joined in to be part of the network. Joins can be at common line end points, or a line end point in one parcel may lie on a boundary line of another parcel. Accordingly, "connectivity" is defined by common end points and by "line Points".

Figure 7:
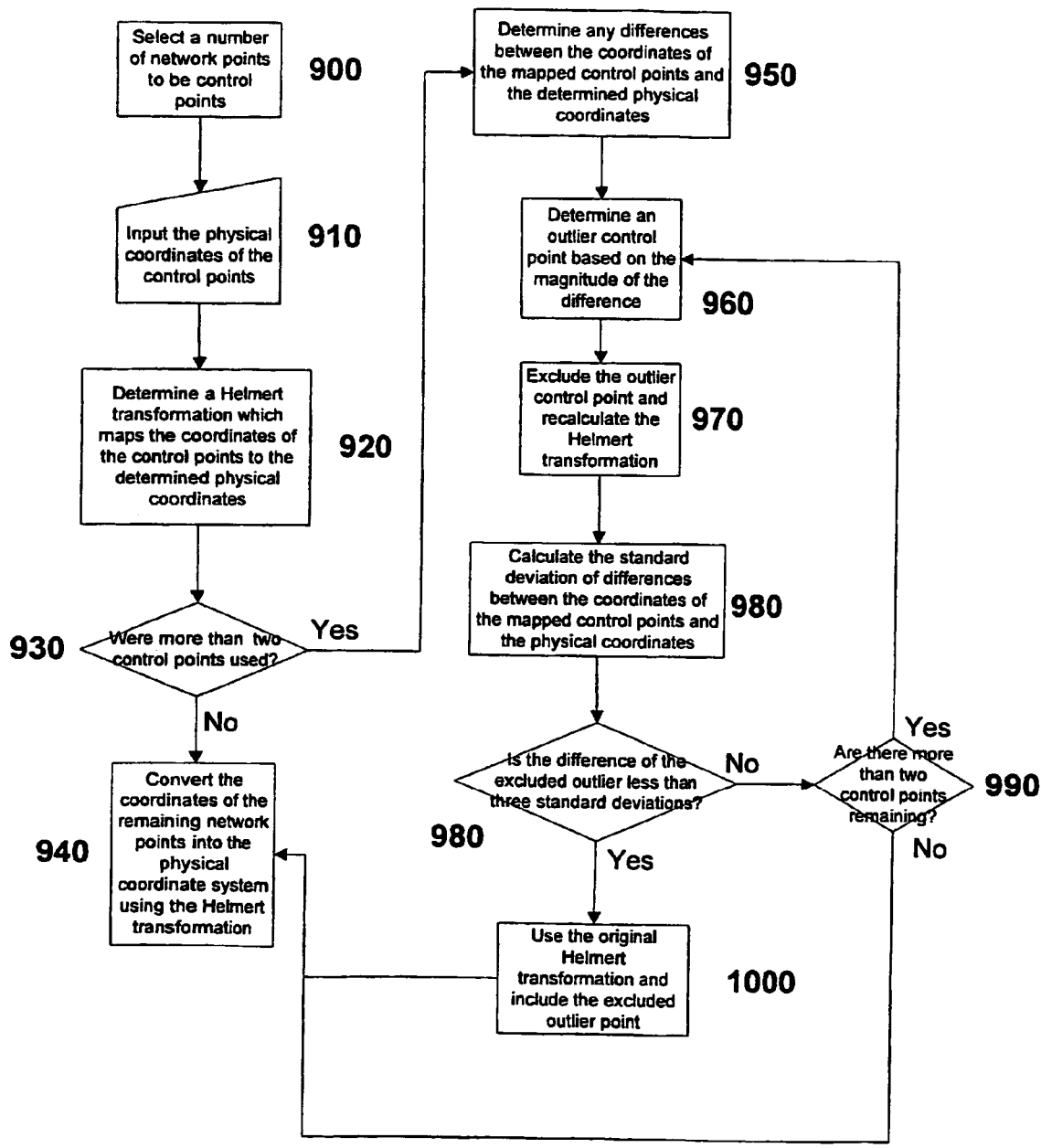

In order to achieve this, the processor 10 will execute parcel joining applications software which causes a respective GUI to be displayed, as shown in FIG. 7. As shown the GUI includes a network display 30, a parcel display 31 and an options menu display 32.

In use, the user selects the new parcel option from the option menu that causes a list of parcels to be displayed in the options menu display 32. This list of parcels is taken from single parcel file which includes all the parcels to be joined together to form the current network.

Figure 5A:
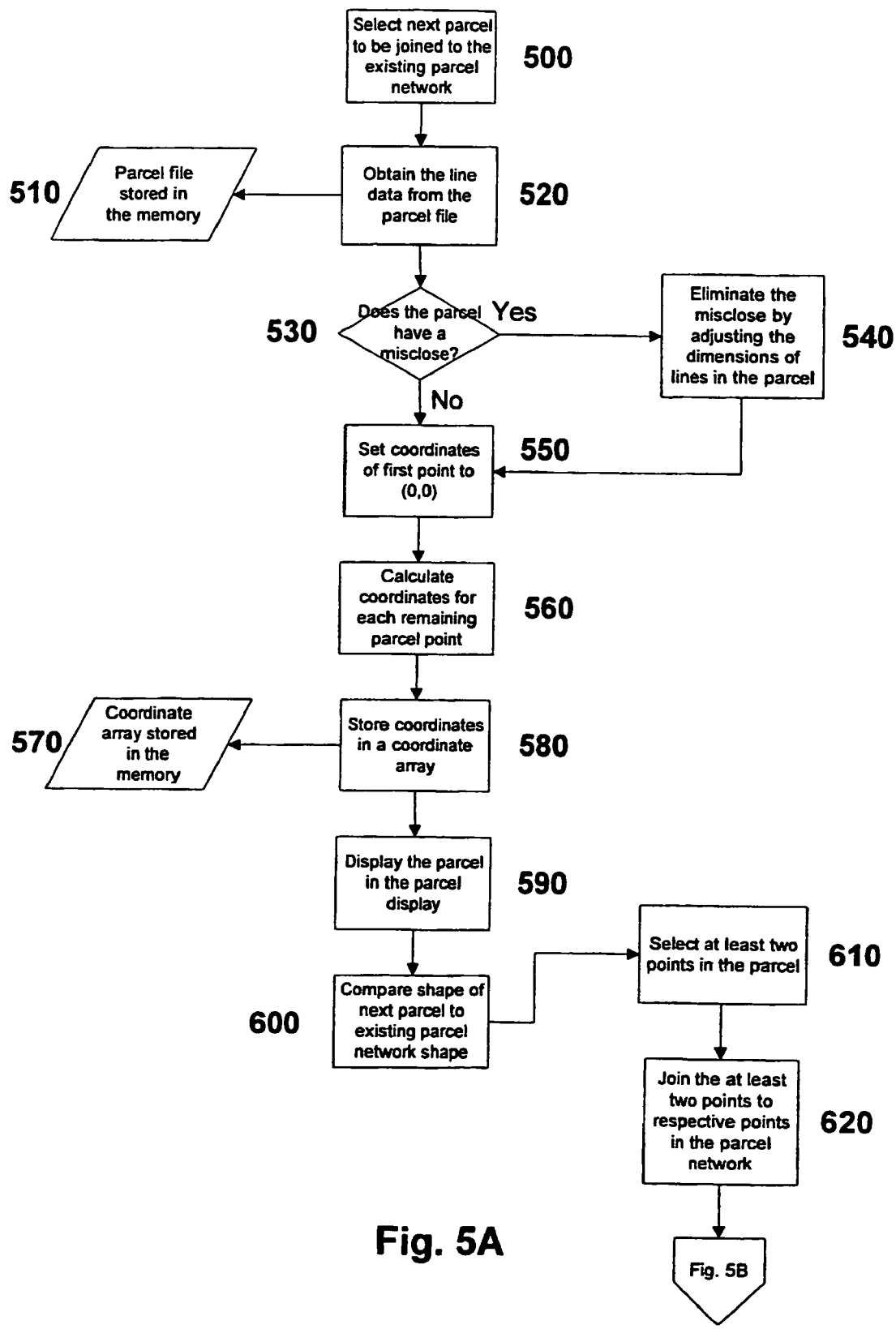
FIGS. 5A, 5B and 5C are flow diagrams showing the joining process.
Figure 5B:
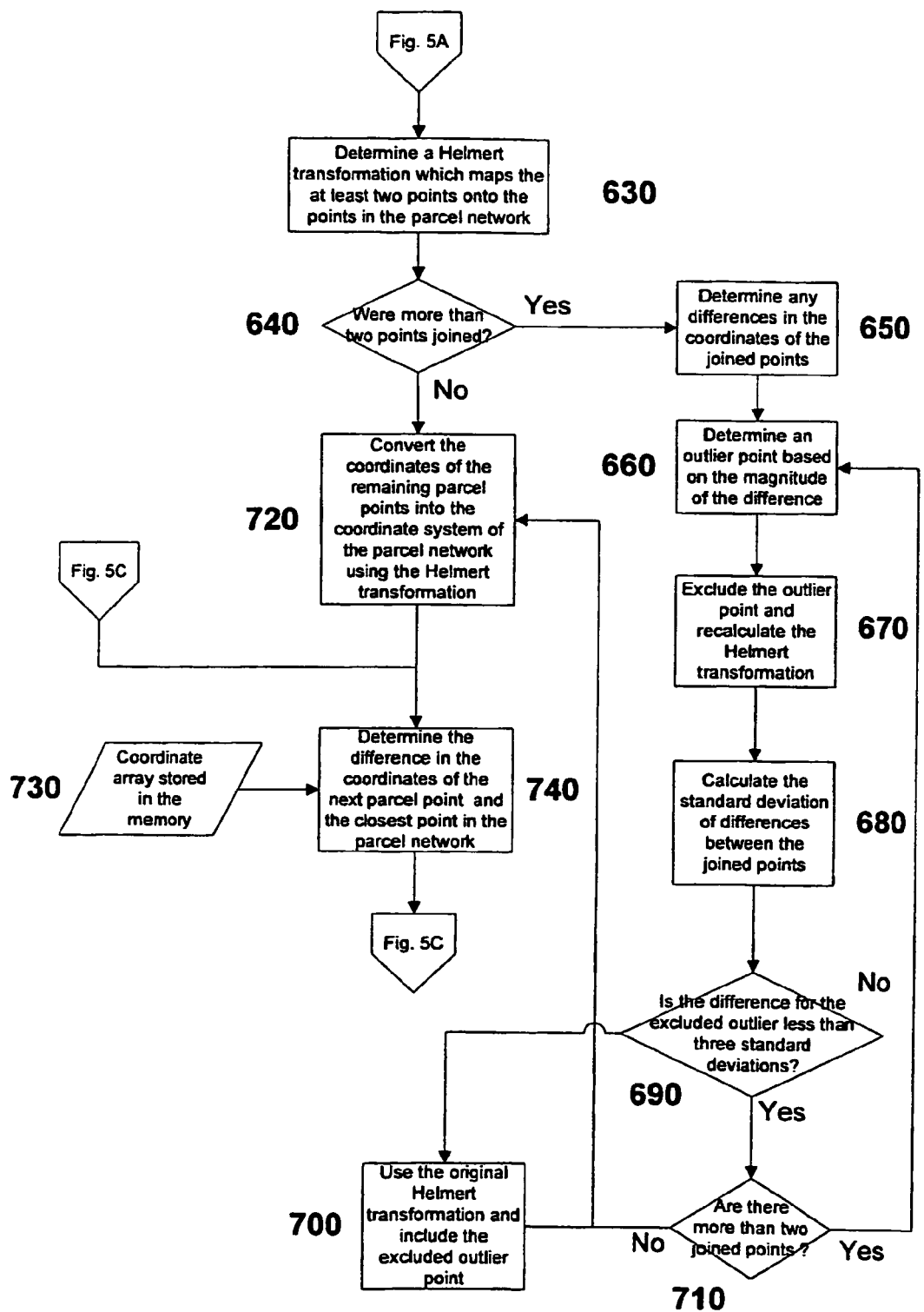
Figure 5C:
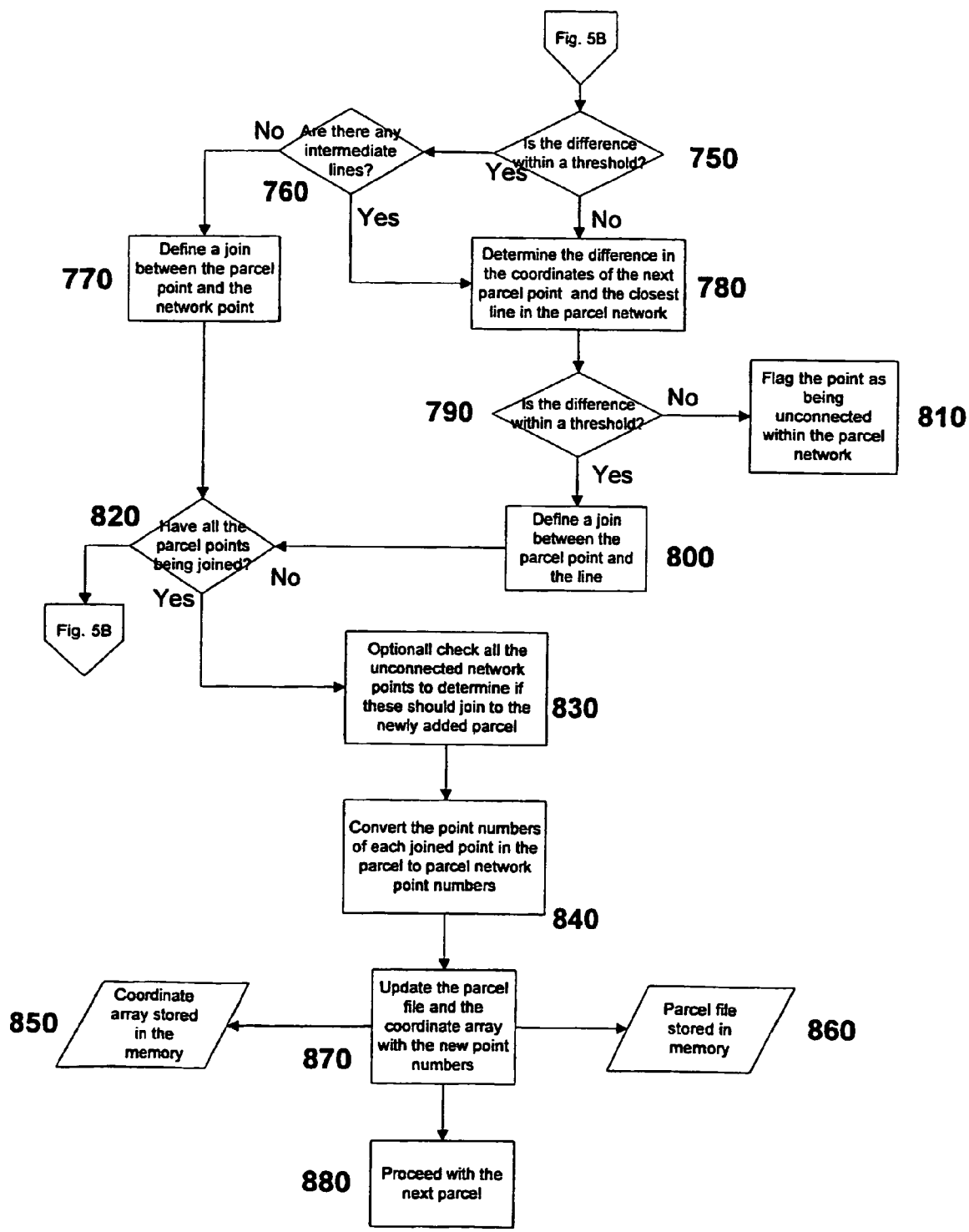

The user then proceeds with the parcel joining phase which will now be described with reference to FIGS. 5A, 5B, 5C. Thus, as shown at step 500, the user then selects the next parcel from the list in the options menu display 32. At this stage the processor 10 operates to obtain the line data corresponding to the parcel as shown at steps 510 and 520. The processor 10 then operates to determine if the parcel includes a misclose at step 530. If a misclose is present, the processor 10 eliminates the misclose by adjusting the dimensions of lines in the parcel.

This is typically achieved using a Bowditch technique to eliminate the misclose as will be appreciated by a person skilled in the art. Once the misclose has been eliminated, or if no misclose existed, the processor 10 moves onto the step 550 and sets the coordinates of the first end point of the parcel to be 0,0. The processor 10 then calculates coordinates for each remaining parcel end point using the dimension and bearing information stored in the respective portion of the parcel file. The calculated coordinates are stored in the coordinate array as shown at 570 and 580. In addition to this, an indication of the coordinates will also be added into the parcel file as shown in Appendix A.

Once the coordinates have been defined, the processor 10 operates to display an image of the parcel in the parcel display 31 as shown at 33. The image of the parcel is scaled to fit in the parcel display 31, with independent pan and zoom controls being provided (not shown) so that details of the parcel structure can be examined in detail.

The next stage is for the user to compare the shape of the parcel displayed in the parcel display 31 with the existing parcels that have already been defined as part of the parcel network. These existing parcels are displayed in the network display 30 as shown at 34.

The user selects at least two parcel end points that correspond to respective points in the parcel network, as shown at 610. Common points are matched by clicking with a mouse on the selected end point of the parcel in the parcel display 31 and then clicking on the network point to which it is to be joined, in the network display 30. If a point has to be placed on a line (a "Line Point") the point is selected with the left button of the mouse and the line with the right mouse button.

Once the parcel end points and the parcel network points have been selected, the processor 10 operates to join the points shown at step 620. In order to achieve this, the processor 10 creates a temporary association between the points by replacing the point numbers of the parcel end points with the point numbers of the corresponding points in the parcel network.

The processor 10 then operates to map mapping the at least two parcel end points from the parcel coordinate system on to the coordinates of the corresponding parcel network points at step 630. This is achieved using a "Helmert" type of transformation which has four parameters (rotation, scale, shift in X and shift in Y) as shown by equations (2) and (3) below:

$$X=ax-by+c \quad (2)$$

$$Y=bx+ay+d \quad (3)$$

Where: X and Y are the coordinates in the parcel network;
x and y are the coordinates in the parcel coordinate system; and,
a, b, c and d are the transformation parameters.

Accordingly, as two equations can be written for each joined point (one in X and one in Y), with two points all the four parameters can be uniquely determined. As a result, any more than two pointsgives a redundant solution and "least squares" procedure can be used to solve for the parameters using the additional equations.

Once the transformation parameters are derived, they are used to calculate a coordinate in the parcel network system for each joined point. If the parcel is not a perfect fit at all points, these coordinates will be different from the corresponding points in the parcel network.

The average difference is computed, and the point with the largest difference from the mean excluded before recalculating the transformation parameters and the standard deviation for the remainder of the set. If the error at the excluded point is less than three times the standard deviation it is included, otherwise it is excluded and the point with the next biggest difference is then excluded and tested in a similar manner. This process is continued until all outliers are identified and excluded.

Accordingly, at step 640, the processor determines if more than two parcel end points were joined. If more than two point were joined, the processor proceeds to step 650 to determine any differences in the coordinates of the joined points. Thus, for example, it may be that three parcel end points are used in the joining technique, whereas the Helmert transformation maybe uniquely defined using only two points. As a result it may not be possible for the resulting transformation to map all three of the parcel end points exactly to corresponding points in the network.

Accordingly, at this point the processor 10 proceeds to the magnitude of the differences between the coordinates of the network points and the coordinates of the mapped parcel end points, together with the value of the mean difference for all the parcel end points.

An outlier point is then determined as the parcel end point whose distance away from the corresponding network point is furthest from the mean distance.

Once the outlier point has been determined at 660 the processor operates to exclude the outlier point and recalculate the Helmert transformation at step 670. The recalculated Helmert transformation is used to join the remaining parcel end points to the corresponding network points.

At step 680 the standard deviation of the differences between the coordinates of the remaining joined parcel end points and the corresponding network points is calculated. If the distance between the excluded outlier and the corresponding network point is less than three standard deviations, the processor 10 determines at step 690 that the original Helmert transformation is acceptable. In this case, the processor 10 proceeds to step 700 and uses the original Helmert transformation including the excluded outlier point.

If the original Helmert transform is deemed unacceptable, the processor 10 determines whether more than two parcel end points were used in the calculation of the second Helmert transformation at step 710. If so, the processor returns to step 660 to determine a further outlier parcel end point from the remaining joined parcel end points.

So, if for example there are four joining points and one is incorrect, this will be detected as an outlier and it will not influence the mapping of the remaining end points as it will be excluded from the Helmert transformation determination. In this case, the outlier will typically be flagged and coloured red on the screen. The residuals (or the distances between the mapped coordinates and the coordinates of the corresponding network point) are displayed in the options menu display 32 allowing the user to accept, reject or edit the joining of the points.

Once the Helmert transformation is deemed acceptable at step 700, or is calculated using only two parcel end points at steps 710 or 640, then the processor proceeds to step 720. At step 720 the processor converts the coordinates of the remaining unjoined parcel end points into the coordinate system of the parcel network using the determined Helmert transformation.

Once the unjoined parcel end points have been transferred into the coordinate system at the parcel network, the processor can then operate correspondence between the parcel end points and parcel boundary lines and points or boundary lines in the network. Accordingly at steps 730 and 740, the processor determines the distance between the coordinates of the next mapped parcel end point and the closest network point. At step 750 the processor determines whether this difference is below a predetermined threshold stored in the memory 11. If so, the processor 10 moves onto step 760 to determine if there are any intermediate boundary lines within the network.

If there are no intermediate boundary lines, the processor 10 determines that the parcel end point corresponds to the respective network point and accordingly defines a join between the parcel end point and the corresponding network point as shown in step 770.

If however the difference is above the predetermined threshold or an intermediate boundary line exists, the processor proceeds to step 780 to determine the distance between of the coordinates of the next parcel end point and the closest part of the boundary line. In this case, if this difference is below a threshold as calculated in step 790 the processor operates to define a join between the parcel end point and the boundary line at step 800.

Alternatively, if the difference is not below a threshold, the processor 10 operates to flag the point as being unconnected within the parcel network as the location of the point cannot be exactly determined. In general, when this occurs this is because the end point will be joined to another parcel which is yet to be added to the network. Otherwise it will be left to the user to create an association in due course.

Once this has been completed, the processor 10 can optionally scan all unconnected network points and determine if these should be joined to any end points or lines of the newly added parcel. This is performed in a similar manner and will therefore not be described in any detail.

Figure 6:
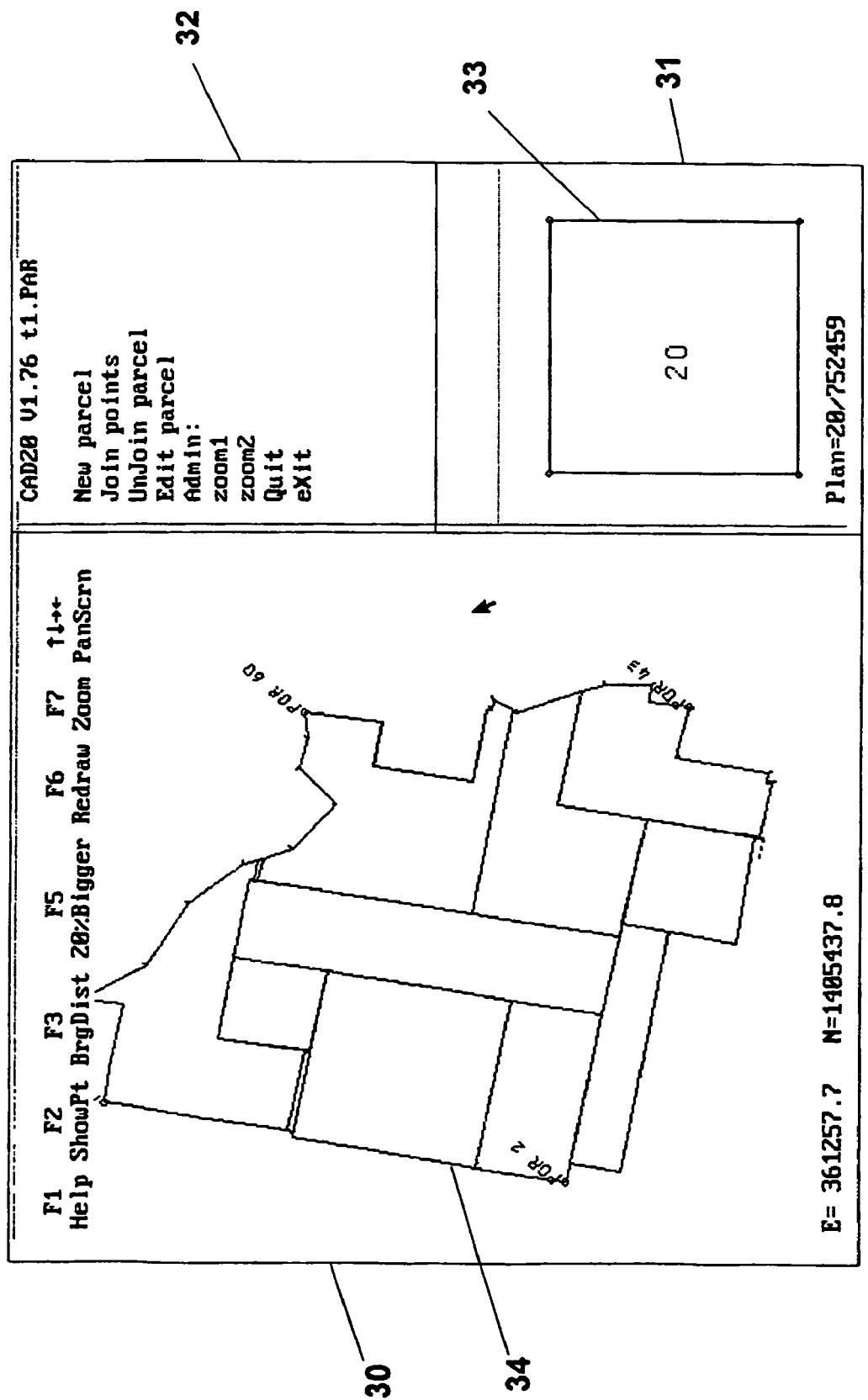
FIG. 6 is a schematic diagram showing the appearance of the display during the parcel joining procedure; and, FIG. 7 is a flow diagram showing the network adjustment process.

At step 810 the processor determines if all the parcel end points have been joined if not, the processor returns to step 740 in FIG. 6B.

Otherwise, the processor converts the point number of each parcel end point to a respective network point number. Thus, for example, the parcel end point number 1 in the parcel maybe converted to network point number 110.

At this point, the parcel file and the coordinate array are updated with the new point numbers as shown at 840, 850 and 860. It will be appreciated from this therefore that the parcel is uniquely defined by the parcel data that defines the length and bearing of each of the parcel boundary lines. The coordinates are therefore an attribute of the parcel end points and accordingly, it is necessary for the point numbers of the end points to be updated in the parcel file as well as in the coordinate file. Once this has been completed, the processor moves onto consider the next parcel at step 890.

Accordingly, at this stage the parcel network displayed in the network display 30 will be re-drawn to include the last connected parcel and the user will operate to select the next parcel from the list of parcel shown in the options screen 32

Once all the parcels or a sufficient number of parcels have be joined into the network, the user can proceed with the network adjustment phase the operation of which will now be described with reference to FIG. 7.

The first stage in the network adjustment process is to determine a number of control points. The control points are network points for which the actual physical location of the point on the Earth's surface can be determined. Thus, for example, it maybe any point in the network that can be readily identified in the physical world such as a survey marker, the corner of a well marked boundary, or the like.

The control points are used to determine transformation parameters between the control coordinate system and that of the existing parcel network using similar routines as used for the parcel joining. Residuals after transformation are reported at the control points and if these within acceptable limits the operation proceeds.

This process uses a variation in coordinates by least squares technique similar to that used to adjust geodetic networks. The adjustment matrix is a banded matrix and there are procedures to reorder the cadastral equations to minimise the band-width. Only the band-width of the upper triangular matrix is stored with a Cholesky solution being used for the matrix reduction.

Accordingly, once a number of network points have been selected at step 900, the user inputs the coordinates of the control points in the control coordinate system at step 910.

The processor then determines a Helmert transformation that maps the coordinates of the control points to the determined control coordinate system at step 920.

At step 930, the processor determines if only two control points are used, in which case the processor continues to step 940 and uses and the determined Helmert transformation to transform the coordinates of the remaining network points. Accordingly, the resulting network map represents a coordinate cadastre with the coordinates of the network now corresponding to actual geographical coordinates.

As in the parcel joining phase, if more than two control points are used in calculating the Helmert transform it is necessary to determine whether the Helmert transform is suitably accurate. In order to achieve this, the processor 10 operates to determine the distances between the transformed coordinates of the network control points and the actual physical coordinates, together with the mean distance of all the control points at step 950.

From this, the processor 10 determines an outlier control point to be the control point whose distance differs most from the mean distance at step 960. Once the outlier has been determined, this is excluded and the Helmert transformation recalculated at step 970.

The processor calculates the standard deviation of the distances between the coordinates of the mapped control points and physical coordinates for the remaining control points at step 980.

In this case, if the distance between the coordinates of the excluded outlier and the physical coordinates is less than three standard deviations the processor 10 uses the original Helmert transformation at step 990. The processor then maps the coordinates of all the remaining network points into the physical coordinates system at step 940.

If however the outlier is not less than three standard deviations in difference, the processor moves onto to step 1000 to determine whether more than two control points remain. If only two control points remain, the processor uses the new Helmert transformation to map the coordinates of the remaining network into the physical coordinate system at step 940.

Otherwise, the processor returns to step 960 to determine an outlier for the remaining control points and then repeat step 970 to 990.

In this form of system the transformation is generally more accurate if more control points are used. However, with these types of large network adjustments it is important to first eliminate any data which does not really contribute to the process and then reorder the data so that the transformation matrix is as dense as possible. Even with the current processes in place, it is not uncommon to carry out an adjustment with over 6 million terms in the normal equations and such a system would tend to become unstable if the initial ordering processes were not carried out.

The logic for the initial selection is as follows:

1) Count the Distances to and Bearings to and from each point, exclude easement lines and make special provision for "unclosed" parcels.
2) Count the line points where the mid point already exists
3) Wipe out any radiation chains that do not join to another part of the network or to a control point.
4) Throw out points without distance observations.
5) Make sure that all connected control points are included Equations are then formed for each bearing, distance and line point. As each equation is formed a residual is calculated and if these are outside a pre-set limit they are reported. If they exceed another pre-set limit, the adjustment is halted after the equation formation phase and before the adjustment proper takes place.

To form the equations an initial orientation is first carried out on each parcel, then an equation is generated for each bearing and each distance as shown by equations (4) and (5) below:

$$\text{Bearing} - \text{computed bearing} + \text{residual} = 0 \quad (4)$$

$$\text{Distance} - \text{computed distance} + \text{residual} = 0 \quad (5)$$

The computed bearing is calculated from the coordinates at each end of the line. This process is akin to treating each parcel as a "direction set" in a geodetic adjustment. The computed distance is calculated from the coordinates at each end of the line. Two bearing equations are also generated for each line point.

The equations are then reordered to minimise the bandwidth. The operation is a complex triple sort and renumbering operation to minimise the maximum difference in coefficient numbers in all equations. The difference in coefficient number determines the band-width of the adjustment matrix.

The equations are used to contribute coefficients in x and y in the adjustment matrix for each point. Each bearing equation also contributes a coefficient for the orientation term for the parcel.

Weights are applied to the equations according to the standard deviations expected for angles and distances at the date of the original survey data. These have been selected after considering the technology available and the survey practise regulations commonly in force at various periods of time. Those currently used are as follows:

| | |
|---|---|
| Before 1880 | Angles 300 seconds, distances 200 mm plus 125 parts per million |
| 1880 to 1907 | Angles 200 seconds, distances 50 mm plus 125 parts per million |
| 1907 to 1980 | Angles 60 seconds, distances 20 mm plus 50 parts per million |
| After 1980 | Angles 30 seconds, distances 10 mm plus 25 parts per million |

The banded transformation matrix is then formed directly and solved using a Cholesky technique.

The excluded data is then used to update the coordinates of all the excluded points and a report written to a file.

A feature of this report is that it analyses every parcel and every line and provides a comprehensive analysis of each parcel as well as a summary of those points, lines and parcels which statistically look suspect. This provides quality assurance for the data as well as providing a means for the user to quickly focus on any problem areas.

So the system is designed to provide Q/A at three levels.

At input, the administration details (parcel id, plan id, date etc) are checked for completion and within preset parameters. The parcel and attached lines are checked for "closure" and the calculated area must be close to the stated area on the plan.

During joining the shape and size of the parcel and its connections is tested against the adjacent network.

The adjustment uses all of the data to determine the most likely position for every corner, then tests every line in the network against this data.

Following the adjustment we have both coordinates for all points in the area plus the topology for all the parcels and the cadastral network. The system has modules to export the data in a variety of formats such as Microstation, Moss, Genamap, Mapinfo etc. So it has effectively transformed the "metes and bounds" cadastral information into a format and structure which can be loaded into any GIS system.

Accordingly, the above described system operates to capture, assemble and analyse the data, then from this analysis determine the number and location of any control. This can be contrasted to traditional and accepted methods of managing any surveying task in which the procedure is to measure a precise control network first and then work from this to fix the position of all the points of interest.

It will be appreciated by persons skilled in the art that numerous variations and modifications will become apparent. All such variations and modifications which become apparent to persons skilled in the art, should be considered to fall within the spirit and scope that the invention broadly appearing before described.

Appendix A

The data entry program writes to a text file, each record is of fixed format and the first two characters define the record type.

| JOB HEADING | Col | Length |
|---|---|---|
| Record Type 70 | 1-2 | |
| Company Name | 3-42 | 42 characters |
| Entry Date | 43-53 | 11 characters |
| Operator Id. | 54-59 | 6 characters |
| Program Versn | 60-73 | 14 characters |

| PARCEL HEADING | Col | Length |
|---|---|---|
| Record Type 71 | 1-2 | |
| Plan Number | 3-12 | 10 characters |
| Date Survey | 13-22 | 10 characters |
| Plan Units | 23 | One character |
| Parcel number | 24-33 | 10 characters |
| Parcel Type | 34-39 | 6 characters |
| Join Flag | 40 | One Character |
| Legal Area | 41-52 | 12 character |
| Centroid Pt | 53-56 | 4 characters |

| PARCEL LINE | Col | Length |
|---|---|---|
| Record Type 72 | 1-2 | |
| From point | 3-6 | 4 characters |
| Bearing | 7-13 | format, DDDMMSS |
| Distance | 14-21 | metres, 8 chars |
| To point | 22-25 | 4 characters |
| Line type | 26-29 | 4 characters |
| Radius | 30-37 | metres 8 chars |
| Centre Pt | 38-41 | centre point |

| LINE POINT | Col | |
|---|---|---|
| Record Type 73 | 1-2 | |
| From Point | 3-7 | Start point |
| Line Point | 8-12 | Point on line |
| To Point | 3-17 | End point |

| POINT COORDINATE | Col | Length |
|---|---|---|
| Record Type 74 | 1-2 | |
| Point Number | 3-8 | 6 characters |
| Easting | 9-20 | 12 characters |
| Northing | 21-32 | 12 characters |

An example of a section of a parcel file for a single parcel is shown below.

```
70Company Name X          01-Dec-1999TM    CAD10 V1.78
71DP813645 27-09-1991M2   13 11098    43
72 41 910000 58.0350 42
72 421810000 19.0000 39 21
72 392710000 46.7000 34
72 343032730 20.7750 33
72 33 391555 10.0000 41 21
73 172 202 174
73 172 205 174
```

Appendix B

The points file is a binary file and data are stored in random access 64 byte records, with the point number being used to select the required record. Point details are stored starting with record 11, thus point 1 is stored in record 11, point 2 is stored in record 12 and so on.

Administrative data at the start of the file is as follows:

| Record | Byte | |
|---|---|---|
| 1 | 1-2 | value of 3 = points file header |
| | 3-4 | Number of records in the file. |
| | 4-5 | Number of records in use in the file. |
| | 6-7 | Start Point number, usually 1 |
| | 8-64 | Not used. |

Co-ordinate data is stored from record 11 as follows:

| Byte | Usage |
|---|---|
| 1-2 | Point Attributes |
| Bits 0 to 3 | Type |
| Bits 4 to 7 | Code |
| Bits 8 to 11 | Data Source |
| 3-12 | ASCII point code - 10 bytes. |
| 13-20 | Easting (Double Precision) |
| 21-28 | Northing (Double Precision) |
| 29-32 | Height (Single Precision) |
| 33-61 | Reserved |
| 61-64 | Data base point number (4 byte integer) |

The invention claimed is:

1. Apparatus for defining a parcel network in a control coordinate system, the parcel network being formed from a number of interconnected parcels, and each parcel being formed from a number of interconnected boundary lines, the apparatus including:

a) an input for receiving survey data defining the number of parcels, the survey data specifying the distance and direction between end points of the interconnected boundary lines for each parcel;

b) a store for storing the survey data;

c) a display; and d) a processor adapted to:

i) join the parcels together to form the parcel network, the parcel network being defined in terms of network coordinates, the network coordinates defining the relative positions of network points in a network coordinate system, each network point corresponding to the position of a parcel end point within the network; and ii) map the coordinates of the network points into the control coordinate system;

wherein the processor is further adapted to join the parcels together by:

causing the user to select an unjoined parcel;

determining relative coordinates of the unjoined parcel, the relative coordinates defining the relative positions of the parcel end points in an arbitrary coordinate system;

causing the display to display:

one or more joined parcels that form an existing parcel network; and an unjoined parcel;

causing the user to define a join between at least two parcel end points of the unjoined parcel and at least two network points;

determining a parcel transformation which maps the relative coordinates of the at least two parcel end points to the network coordinates of the corresponding network points; and applying the parcel transformation to each of the parcel end points, to thereby map the parcel coordinates into the network coordinate system, thereby joining the parcels.

2. Apparatus according to claim 1, the processor being adapted to map the coordinates of the network points into the control coordinate system by:
   a) selecting two or more network points to be control points;
   b) determining control coordinates of the control points, the control coordinates representing the position of the control points in the control coordinate system;
   c) determining a network transformation which maps the network coordinates of the control points to the corresponding control coordinates; and
   d) applying the network transformation to each of the network points, to thereby map the parcel network to the control coordinate system.

3. Apparatus according to claim 2, wherein if more than two control points were used in determining the network transformation, the processor is further adapted to:
   a) determine the separation distance between the mapped network coordinates and the corresponding control coordinates for each of the control points used in determining the network transformation;
   b) determine an outlier control point in accordance with the results of the separation distance determination;
   c) determine a new network transformation excluding the outlier point;
   d) determine the separation distance between the mapped network coordinates and the corresponding control coordinates for each of the control points used in determining the new network transformation;
   e) determine the standard deviation of the separation distance for the new network transformation;
   f) compare the separation distance of the outlier to a threshold equal to three standard deviations; and either:
      i) use the original network transformation if the separation distance of the outlier is less than the threshold; or
      ii) use the new network transformation if the new network transformation is determined using only two control points; or
      iii) repeat steps (a) to (f) for the new parcel transformation.

4. Apparatus according to claim 3, wherein the outlier control point is determined by:
   a) determining the average separation distance for the control points; and
   b) determining the outlier control point to be the control point whose separation distance differs most from the average separation distance.

5. Apparatus according to claim 1, wherein upon input of the survey data for each parcel, the processor is adapted to:
   a) calculate any misclose for the parcel;
   b) cause the misclose to be compared to a predetermined misclose; and
   c) cause the input data to be checked if the misclose exceeds the predetermined misclose.

6. Apparatus according to claim 5, wherein the comparison is performed by the user.

7. Apparatus according to claim 5, wherein the predetermined misclose is selected in accordance with the date on which the survey data was generated.

8. Apparatus according to claim 1, wherein if more than two end points were used in determining the parcel transformation, the processor is further adapted to:
   a) determine the separation distance between the mapped relative coordinates of the end point and the network coordinates of the corresponding network point for each of the parcel end points used in determining the parcel transformation;
   b) determine an outlier end point in accordance with the results of the separation distance determination;
   c) determine a new parcel transformation excluding the outlier point;
   d) determine the separation distance between the mapped relative coordinates of the end point and the network coordinates of the corresponding network point for each of the parcel end points used in determining the new parcel transformation;
   e) determine the standard deviation of the separation distance for the new parcel transformation;
   f) compare the separation distance of the outlier to a threshold equal to three standard deviations; and either:
      i) use the original parcel transformation if the separation distance of the outlier is less than the threshold; or
      ii) use the new parcel transformation if the new parcel transformation is determined using only two end points; or
      iii) Repeat steps (a) to (f) for the new parcel transformation.

9. Apparatus according to claim 8, wherein the outlier end point is determined by:
   a) determining the average separation distance for the end points; and
   b) determining the outlier point to be the end point whose separation distance differs most from the average separation distance.

10. Apparatus according to claim 1, wherein the processor is adapted to join the parcels together to form the parcel network by:
    a) selecting an unjoined parcel;
    b) joining the unjoined parcel to one or more joined parcels; and
    c) repeating steps (a) and (b) for each unjoined parcel.

11. Apparatus according to claim 1, wherein upon input of the survey data for each parcel, the processor is adapted to:
    a) calculate the area of the parcel;
    b) cause the area to be compared to a survey area determined when the parcel was surveyed; and
    c) cause the input data to be checked if the area differs from the survey area by more than a predetermined amount.

12. A parcel network generated using the apparatus of claim 1.

13. A method of defining a parcel network in a control coordinate system, the parcel network being formed from a number of interconnected parcels, and each parcel being formed from a number of interconnected boundary lines, the method including:
    a) receiving survey data defining the number of parcels, the survey data specifying the distance and direction between end points of the interconnected boundary lines for each parcel;
    b) joining the parcels together to form the parcel network, the parcel network being defined in terms of network coordinates, the network coordinates defining the relative positions of network points in a network coordinate system, each network point corresponding to the position of a parcel end point within the network, wherein joining the parcels together includes:
       selecting an unjoined parcel;
       determining relative coordinates of the unjoined parcel, the relative coordinates
    defining the relative positions of the parcel end points in an arbitrary coordinate system;

defining a join between at least two parcel end points of the unjoined parcel and at least two network points;

determining a parcel transformation which maps the relative coordinates of the at least two parcel end points to the network coordinates of the corresponding network points; and applying the parcel transformation to each of the parcel end points, to thereby map the parcel coordinates into the network coordinate system, thereby joining the parcels; and c) mapping the coordinates of the network points into the control coordinate system.

14. A method according to claim 13, the method of mapping the coordinates of the network points into the control coordinate system including:
a) selecting two or more network points to be control points;
b) determining control coordinates of the control points, the control coordinates representing the position of the control points in the control coordinate system;
c) determining a network transformation which maps the network coordinates of the control points to the corresponding control coordinates; and
d) applying the network transformation to each of the network points, to thereby map the parcel network to the control coordinate system.

15. A method according to claim 14, wherein if more than two control points were used in determining the network transformation, the method further includes:
a) determining the separation distance between the mapped network coordinates and the corresponding control coordinates for each of the control points used in determining the network transformation;
b) determining an outlier control point in accordance with the results of the separation distance determination;
c) determining a new network transformation excluding the outlier point;
d) determining the separation distance between the mapped network coordinates and the corresponding control coordinates for each of the control points used in determining the new network transformation;
e) determining the standard deviation of the separation distance for the new network transformation;
f) comparing the separation distance of the outlier to a threshold equal to three standard deviations; and either:
  i) using the original network transformation if the separation distance of the outlier is less than the threshold; or
  ii) using the new network transformation if the new network transformation is determined using only two control points; or
  iii) repeating steps (a) to (f) for the new parcel transformation.

16. A method claim 15, wherein the outlier control point is determined by:
a) determining the average separation distance for the control points; and
b) determining the outlier control point to be the control point whose separation distance differs most from the average separation distance.

17. A method according to claim 13, wherein if more than two end points were used in determining the parcel transformation, the method further includes:
a) determining the separation distance between the mapped relative coordinates of the end point and the network coordinates of the corresponding network point for each of the parcel end points used in determining the parcel transformation;
b) determining an outlier end point in accordance with the results of the separation distance determination;
c) determining a new parcel transformation excluding the outlier point,
d) determining the separation distance between the mapped relative coordinates of the end point and the network coordinates of the corresponding network point for each of the parcel end points used in determining the new parcel transformation;
e) determining the standard deviation of the separation distance for the new parcel transformation;
f) comparing the separation distance of the outlier to a threshold equal to three standard deviations; and either:
  i) using the original parcel transformation if the separation distance of the outlier is less than the threshold; or,
  ii) using the new parcel transformation if the new parcel transformation is determined using only two end points; or
  iii) repeating steps (a) to (f) for the new parcel transformation.

18. A method according to claim 17, wherein the outlier end point is determined by:
a) determining the average separation distance for the end points; and
b) determining the outlier point to be the end point whose separation distance differs most from the average separation distance.

19. A method according to claim 13, wherein upon input of the survey data for each parcel, the method includes:
a) calculating any misclose for the parcel;
b) causing the misclose to be compared to a predetermined misclose; and,
c) causing the input data to be checked if the misclose exceeds the predetermined misclose.

20. A method according to claim 19, wherein the predetermined misclose is selected in accordance with the date on which the survey data was generated.

21. A method according to claim 13, the method joining the parcels together to form the parcel network including:
a) selecting an unjoined parcel;
b) joining the unjoined parcel to one or more joined parcels; and
c) repeating steps (a) and (b) for each unjoined parcel.

22. A method according to claim 13, wherein upon input of the survey data for each parcel, the method includes:
a) calculating the area of the parcel;
b) causing the area to be compared to a survey area determined when the parcel was surveyed; and
c) causing the input data to be checked if the area differs from the survey area by more than a predetermined amount.

23. A parcel network generated according to the method of claim 13.

* * * * *